US008121761B2

(12) United States Patent
Bourbiel et al.

(10) Patent No.: US 8,121,761 B2
(45) Date of Patent: Feb. 21, 2012

(54) ACCELERATION SENSOR ARRANGEMENT, SAFING ARRANGEMENT FOR AN ACTIVATION SYSTEM, ACTIVATION SYSTEM

(75) Inventors: Felix Bourbiel, Stuttgart (DE); Brian Klink, Fenton, MI (US); Juergen Piroth, Bretzenheim (DE)

(73) Assignee: Freescale Semiconductor, Inc., Austin, TX (US)

( * ) Notice: Subject to any disclaimer, the term of this patent is extended or adjusted under 35 U.S.C. 154(b) by 726 days.

(21) Appl. No.: 12/278,440

(22) PCT Filed: Feb. 7, 2006

(86) PCT No.: PCT/EP2006/001053
§ 371 (c)(1),
(2), (4) Date: Aug. 6, 2008

(87) PCT Pub. No.: WO2007/090417
PCT Pub. Date: Aug. 16, 2007

(65) Prior Publication Data
US 2009/0024284 A1    Jan. 22, 2009

(51) Int. Cl.
*G05D 3/12*    (2006.01)
(52) U.S. Cl. .................... 701/45; 280/734; 340/438
(58) Field of Classification Search .............. 280/728.1, 280/734; 340/438; 701/45
See application file for complete search history.

(56) References Cited

U.S. PATENT DOCUMENTS

| | | | | |
|---|---|---|---|---|
| 5,014,810 A * | 5/1991 | Mattes et al. | ................ | 180/268 |
| 5,389,822 A * | 2/1995 | Hora et al. | ................ | 307/10.1 |
| 5,483,451 A * | 1/1996 | Ohmae et al. | ................ | 701/46 |
| 5,544,915 A * | 8/1996 | Fendt et al. | ................ | 280/735 |
| 5,631,834 A * | 5/1997 | Tsurushima et al. | ........... | 701/45 |
| 5,801,619 A * | 9/1998 | Liu et al. | ................ | 340/436 |
| RE36,122 E * | 3/1999 | Mattes et al. | ................ | 180/268 |
| 5,949,363 A * | 9/1999 | Kosiak et al. | ................ | 341/173 |
| 6,125,313 A * | 9/2000 | Watanabe et al. | ............... | 701/45 |
| 6,299,102 B2 * | 10/2001 | Happ | ................ | 244/122 AG |
| 6,438,475 B1 * | 8/2002 | Gioutsos et al. | ............... | 701/45 |
| 6,465,907 B2 * | 10/2002 | Ueno et al. | ................ | 307/10.1 |
| 6,504,264 B2 * | 1/2003 | Ueno et al. | ................ | 307/10.1 |
| 7,281,599 B2 * | 10/2007 | Takeuchi et al. | .............. | 180/274 |
| 7,333,883 B2 * | 2/2008 | Geborek et al. | ............... | 701/45 |
| 7,653,468 B2 * | 1/2010 | Wellhoefer et al. | ............. | 701/46 |
| 2009/0024284 A1 * | 1/2009 | Bourbiel et al. | ............... | 701/45 |

FOREIGN PATENT DOCUMENTS

| | | |
|---|---|---|
| DE | 19828432 A1 | 1/2000 |
| DE | 102004018824 B3 | 12/2005 |
| EP | 0453236 A1 | 10/1991 |
| EP | 0965501 A2 | 12/1999 |
| EP | 1602532 A | 12/2005 |
| WO | 2004110820 A | 12/2004 |

* cited by examiner

*Primary Examiner* — Paul N Dickson
*Assistant Examiner* — Nicole Verley

(57) ABSTRACT

An acceleration sensor arrangement comprises, in one package, an acceleration threshold detector for detecting acceleration and for providing an output signal and a processor circuit for receiving the output signal. The acceleration threshold detector provides an output signal having a first value when the acceleration is less than a predetermined threshold and is arranged to switch the output signal from the first value to a second value when the acceleration reaches the predetermined threshold. The processor circuit generates an event signal to trigger an event, such as the closing of a safing transistor switch in an airbag system, in response to the output signal from the acceleration threshold detector switching to the second value.

20 Claims, 3 Drawing Sheets

ACCELERATION SENSOR ARRANGEMENT, SAFING ARRANGEMENT FOR AN ACTIVATION SYSTEM, ACTIVATION SYSTEM

FIELD OF THE INVENTION

This invention relates to an acceleration sensor arrangement, a safing arrangement for an activation system and an activation system, such as an airbag system.

BACKGROUND OF THE INVENTION

Activation systems in automotive applications include systems such as an airbag igniter system for airbag deployment and a seat belt pretensioner activation system.

An igniter system comprises an activation element or igniter element which converts electrical energy to heat. Typically, the igniter element, also known as a squib, comprises a hot wire bridge which is heated by a firing signal, for example a firing current of 1-2 Amps (A). In, for example, airbag applications, the heat generated in the igniter element ignites a pyrotechnic material adjacent the igniter element which burns a propellant. This produces gas to inflate the airbag.

A particular concern for automotive manufacturers is the possibility of activation elements activating inadvertently due to a fault. For example, inadvertent activation of an airbag may disturb a driver and possibly cause an accident. Thus, drive circuits used for generating the firing or activation signal are designed to minimise inadvertent activation and to ensure reliable operation. FIG. 1 illustrates a known simplified airbag activation circuit.

FIG. 1 illustrates an igniter element or squib 101 coupled to a drive circuit 103. The drive circuit 103 is implemented in a single Application Specific Integrated Circuit (ASIC) and comprises functionality for generating the firing signal which activates the squib 101. More specifically, the drive circuit 103 comprises a switch arrangement including a high side switch FET (Field Effect Transistor) 105 and a low side switch FET 107. During normal operation, when the airbag is not deployed, the high side FET 105 and the low side FET 107 are both in an off state and no current can flow through the squib. The use of two switch transistors in series provides increased reliability and failure prevention. Particularly, if either one of the switch FETs short circuits, this will not result in an activation of the airbag as the other switch FET will be in the off state.

The high side FET 105 and the low side FET 107 are each controlled by a control circuit 109. The control circuit 109 is coupled to a main processor 110 which is connected to one or more crash sensors, such as an accelerometer or acceleration sensor, only one 111 of which is shown in FIG. 1, to determine when a particular crash condition is occurring in which an airbag should be deployed. The control circuit 109 produces a signal which switches the low side FET 107 off during normal operation and on if the airbag is being activated and also controls the high side FET 105 to be off during normal operation and on during airbag activation.

Typically, the drive circuit 103 is not directly connected to the energy supply. Rather, a power switch transistor known as a safing switch 113 is coupled in series with the drive circuit 103. The safing switch 113 is generally an external discrete FET component. The safing switch 113 provides further failure prevention by providing additional redundancy in the airbag activation operation.

Specifically the operation of the safing switch 113 is controlled by a control circuit 115 in response to different sensor inputs than those used for activating the drive circuit. One safing acceleration sensor 112 is shown in FIG. 1. For semiconductor acceleration sensors, in order to enhance failure prevention, the safing switch 113 is controlled by a completely different microprocessor operating a different crash detection algorithm and with different sensor inputs than for the drive circuit 103. In this case, the control circuit 115 may be a small microprocessor. Thus, the airbag is only activated if both redundant evaluations detect the occurrence of a crash in which case the high side FET 105 and the low side FET 107 of the drive circuit as well as the safing switch 113 are switched on. The safing switch 113 is operated as a simple on/off switch. In some applications, several safing switches are used to provide independent safety switches for different drive circuits. For example, each squib may be provided with its own safing switch.

The safing switch 113 is coupled to a reverse flow blocking diode 117. The reverse flow blocking diode 117 is connected to a capacitor 125 coupled to receive the battery voltage Vbat and which provides the power supply to the drive circuit 103 and squib 101.

In the past, acceleration sensors 111 and 112 have typically comprised mechanical acceleration sensors. The output of each mechanical acceleration sensor is open or a short circuit depending on the sensed acceleration and controls the opening and closing of a transistor switch, such as the safing switch 113, the high side FET 105 and/or the low side FET 107. Thus, the output of the mechanical sensor determines whether the transistor switch is closed or open and thus, for example, whether the igniter element 101 is activated or not activated, respectively. Such mechanical sensors are large external components and thus increase the size and cost of an airbag system. In addition, since a spring in the mechanical sensor determines how long for which the transistor switch is closed, such a sensor does not allow you to vary how long the transistor switch is closed which may be desired on initial set-up and testing.

With the desire to reduce the size of airbag systems and provide a more programmable system, the safing mechanical sensor has been replaced by a small microprocessor and a micromachined acceleration sensor which has a linear output. The micromachined acceleration sensor is provided in a integrated package and is significantly smaller than the mechanical sensors. On a separate integrated circuit, a microprocessor, which in FIG. 1 is designated by reference numeral 115, processes the linear output from the micromachined sensor to control the opening and closing of safing switch 113. The microprocessor 115 may also coupled the linear output to the main airbag processor 110 for use in controlling the activation of the igniting element 101. Since the output of the micromachined acceleration sensor is linear and coupled to the microprocessor 115 such a system is much more flexible and allows for programming of parameters such as the acceleration value which causes the transistor switch to be closed.

Similarly, the mechanical acceleration sensors 111 coupled to the main processor 111 have been replaced by micromachined sensors and the functionality of the small microprocessor 115 has been incorporated into the main processor 110.

With the aim of reducing overall system cost, there is a desire to reduce the cost of implementing acceleration sensors in activation systems, such as airbag systems.

SUMMARY OF THE INVENTION

The present invention provides an acceleration sensor arrangement, a safing arrangement and an activation system as described in the accompanying claims.

BRIEF DESCRIPTION OF THE DRAWINGS

An acceleration sensor arrangement, a safing arrangement and an activation system in accordance with the present invention will now be described, by way of example only, with reference to the accompanying figures in which.

DETAILED DESCRIPTION OF THE DRAWINGS

As discussed above, currently micromachined acceleration sensors are used which provide a linear output which is coupled to the microprocessor 115 and the main processor 110. It has been realised that for the purposes of detecting acceleration in an activation system such as an airbag system or a seat belt pretensioner system, it is not necessary for the sensor to provide a linear output.

Figure 1:
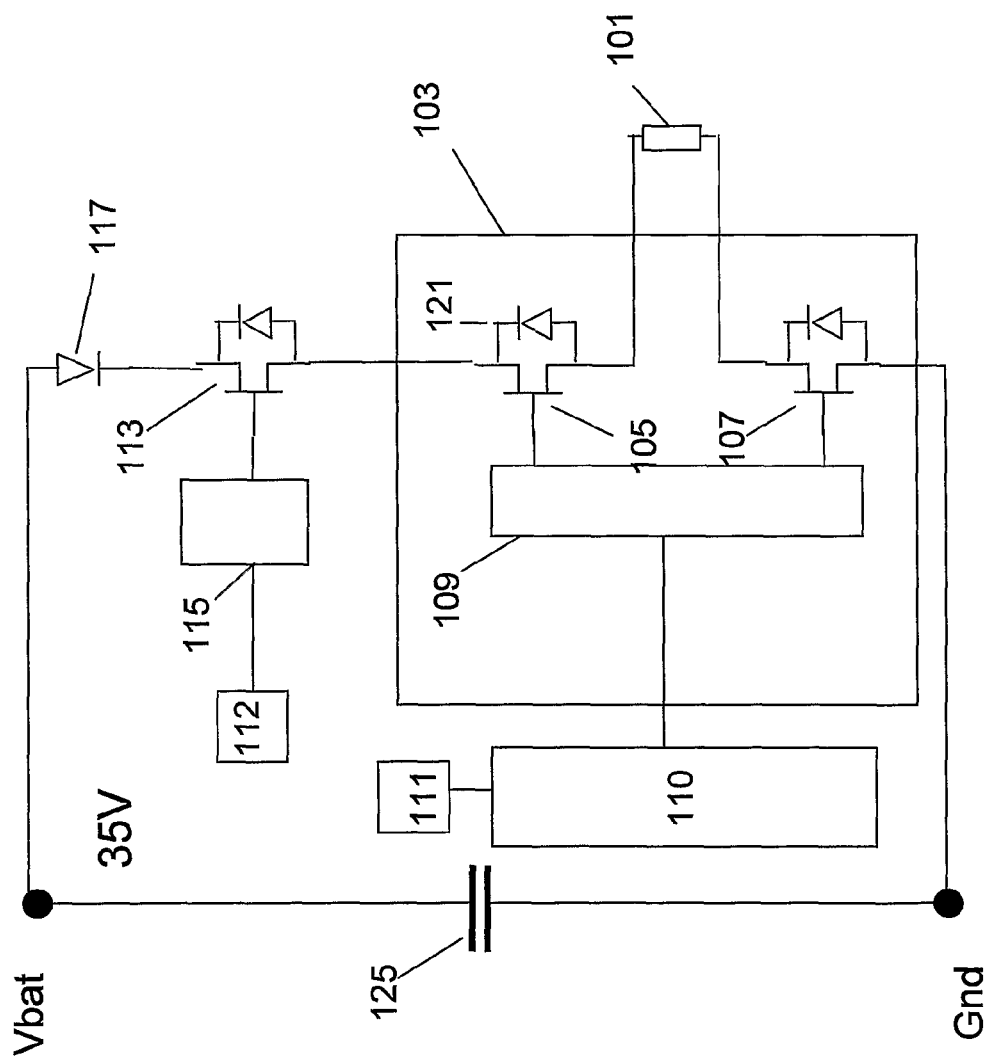
FIG. 1 is a simplified schematic circuit diagram of a prior art airbag activation circuit.
Figure 2:
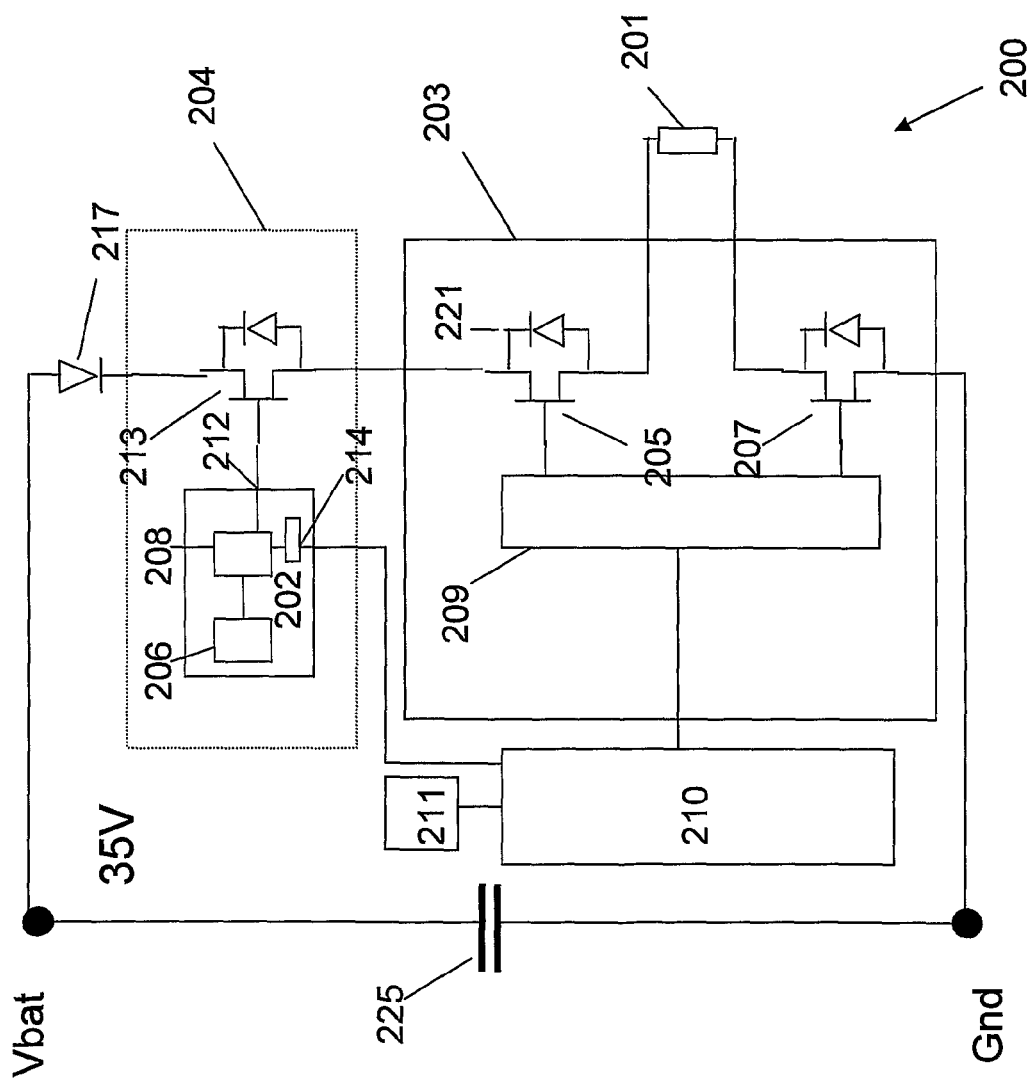
FIG. 2 is a simplified schematic circuit diagram of an airbag activation circuit in accordance with the present invention.

Referring now to FIG. 2 which shows an acceleration sensor arrangement 202 in accordance with the present invention as part of a safing arrangement for an activation system. In the arrangement shown in FIG. 2, the activation system is an airbag system similar to that shown in FIG. 1. Like components to those of FIG. 1 are referred to by the same reference numeral plus the number 100.

The airbag system 200 comprises an activation element such as an igniter element or squib 201 coupled to a drive circuit 203. The drive circuit 203 is implemented in a single Application Specific Integrated Circuit (ASIC) and comprises functionality for generating the firing signal which activates the squib 201. More specifically, the drive circuit 203 comprises a switch arrangement including a high side switch FET (Field Effect Transistor) 205 and a low side switch FET 207.

The high side FET 205 and the low side FET 207 are each controlled by a control circuit 209. The control circuit 209 is coupled to a main processor 210 which is connected to one or more crash sensors, such as an accelerometer or acceleration sensor, to determine when a particular crash condition is occurring in which an airbag should be deployed. Only one acceleration sensor 211 is shown in FIG. 2. The control circuit 209 produces a signal which switches the low side FET 207 off during normal operation and on if the airbag is being activated and also controls the high side FET 205 to be off during normal operation and on during airbag activation. During normal operation, when the airbag is not deployed, the high side FET 205 and the low side FET 207 are both in an off state and no current can flow through the squib.

The airbag system 200 further comprises a safing switch 213 coupled in series with the drive circuit 203 to the battery voltage Vbat which provides the power supply to the drive circuit 203 and squib 201. The safing switch 213 provides further failure prevention by providing additional redundancy in the airbag activation operation. The safing switch 213 is coupled to a reverse flow blocking diode 217. The reverse flow blocking diode 217 is connected to a capacitor 225 coupled to receive the battery voltage Vbat. The safing switch 213 is coupled to the acceleration sensor arrangement 202.

Figure 3:
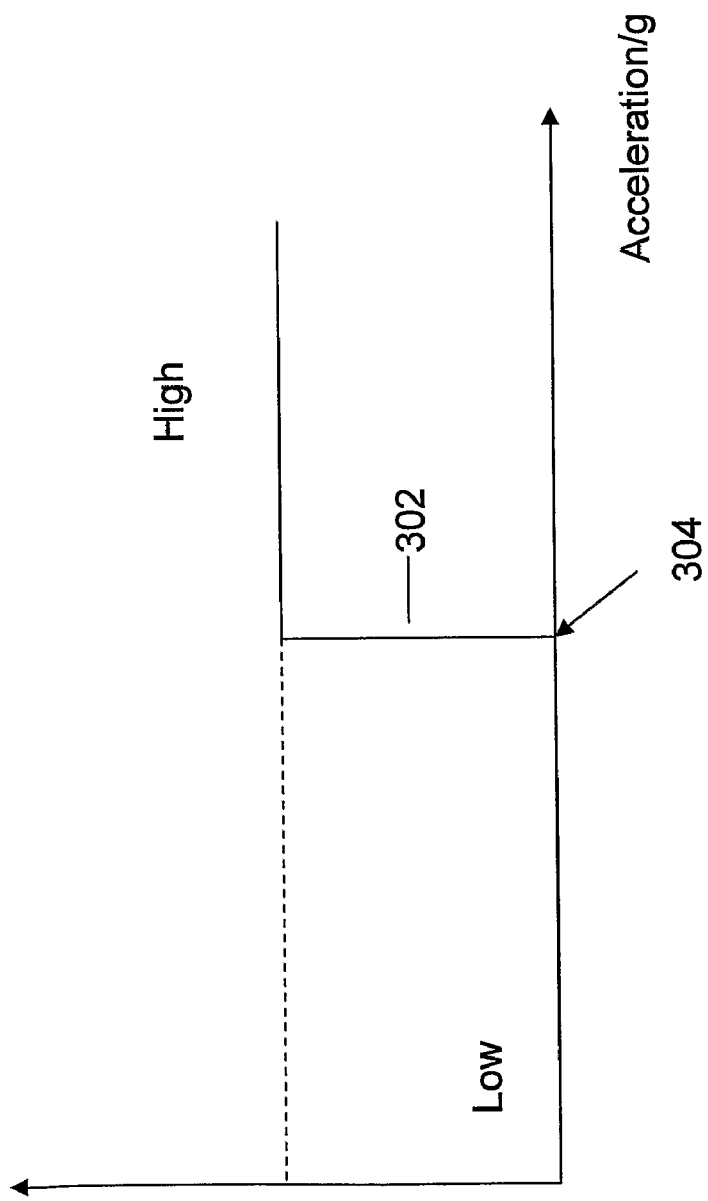
FIG. 3 is a graph showing the output signal provided by the acceleration threshold detector of FIG. 2 for different acceleration values.

The acceleration sensor arrangement 202 comprises an acceleration threshold detector 206 having an output coupled to a processor circuit 208 for processing an output signal provided at the output of the threshold detector 206. The acceleration threshold detector 206 detects acceleration and provides an output signal having a first value when the acceleration is less than a predetermined threshold and switches the output signal from the first value to a second value when the acceleration reaches the predetermined threshold. Referring now to FIG. 3 which shows the value of the output signal 302 from the acceleration threshold detector 206 as the detected acceleration changes according to one example, the output signal 302 is low (e.g. 0 volts) when the detected acceleration is less than the predetermined threshold indicated by reference numeral 304 and switches high (e.g. 5 volts) when the detected acceleration reaches the predetermined threshold 304.

The acceleration threshold detector 206 may therefore be a simple detector comprising a piezo element or a micromachined element or other device which can provide an output signal having one of two values dependent on the detected acceleration.

The processor circuit 208 is coupled to the acceleration threshold detector 206 and receives the output signal 302 from the acceleration threshold detector 206 and generates an event signal at an output 212 to trigger an event when the output signal switches to the second value. The processor circuit 208 includes a logic interface 214, such as a SPI interface, for coupling to the main processor 210, logic (not shown) for processing the output signal from the acceleration threshold detector 206, and an output pin (Pull Fire Enable Pin) coupled to the output 212 of the acceleration sensor arrangement 202. The acceleration sensor arrangement 202 may also comprise additional functionality such as:

a) Buck converter for generating a voltage supply (3.3-5 volts) for the main processor 210, control circuit 209 and other circuits requiring such a supply voltage;

b) Boost converter for generating a boosted voltage supply (20-49 volts) for the control circuit 209;

c) External watch dog timer;

d) On-board voltage monitoring;

e) Reset logic;

f) Low Voltage Interrupt (LVI) function;

g) LED drivers for warning lamps; and/or h) PWM output for switching off the fuel pump In the arrangement shown in FIG. 2, the event signal is provided to the safing transistor switch 213 to control the opening and closing of the safing transistor switch 213. An event signal from the processor circuit 208 may also be provided to the main processor 210. Thus, the operation of the safing switch 213 is controlled by the event signal generated by the acceleration sensor arrangement.

In operation, when the acceleration threshold detector 206 detects the acceleration reaching the predetermined threshold 304, the output signal of the acceleration threshold detector 206 switches to a second value (e.g. high). In response, the processor circuit generates an event signal which is provided to the control electrode of the safing switch 213 to close the safing switch 213. However, the squib 201 is only activated if the main processor 210 detects the occurrence of a crash in which case the high side FET 205 and the low side FET 207 of the drive circuit as well as the safing switch 213 are switched on.

The predetermined threshold 304 which determines when the output signal from the acceleration threshold detector switches from the first value to the second value may be set at the time of manufacture or programmed after manufacture. The latter is useful when the acceleration sensor arrangement is used in a car. The level at which the predetermined threshold needs to be set will depend on the car body: for example, different types of cars will require different values for the predetermined threshold. Thus, once crash tests for the car have been performed and the optimum value can be determined, the optimum value can then be programmed as the predetermined threshold 304 for the acceleration threshold detector. A look-up table in the main processor 210 may store different values of the predetermined threshold for different car bodies. After manufacturing a new car, on first power up of the main processor 210 and the airbag system 200, the value of the predetermined threshold for the particular car may be read out and then programmed into the acceleration sensor arrangement 202.

The programming of the predetermined threshold 304 can be achieved, for example, using the SPI interface 214 and fuses (not shown) implemented in the acceleration sensor arrangement 202. Once the fuses have been programmed, the predetermined threshold 304 may not be varied.

The processor circuit 208 may be programmed, for example, via the SPI interface 214, so that the event, such as the closing of the safing switch 213, is maintained for a predetermined duration. In addition or alternatively, the processor circuit may be programmed such that there is a delay between when the output signal from the acceleration threshold detector 206 switches to the second value (e.g. goes high) and when the event signal is provided to trigger the event. Other parameters may also be programmed. The ability to be able to program these different parameters (such as the duration and delay) ensures that the activation system can be optimised for the particular application and situation in which it is implemented.

The acceleration sensor arrangement 202 is a semiconductor acceleration sensor arrangement in that the acceleration threshold detector 206 is a semiconductor threshold detector. The acceleration threshold detector 206 is formed in the same package as the processor circuit 208. The acceleration threshold detector 206 may be integrated on the same integrated circuit or die as the processor circuit 208 or may be formed on a separate integrated circuit. The safing switch 213 may be an external discrete component or may be part of the same package and may also be integrated on the same integrated circuit as the acceleration threshold detector 206 and processor circuit 208 as shown in dotted lines by box 204.

The acceleration sensor arrangement has been described above in relation to controlling the opening and closing of a safing transistor switch in an airbag system. It will be appreciated that it is not intended to limit the invention to use in a safing arrangement nor to an airbag system. The acceleration sensor arrangement in accordance with the invention may be used in other activation systems such as a seat belt pretension system and may be used in airbag arrangements which do not require safing switches (for example, side airbag arrangements). Furthermore, it will be appreciated that the event signal generated by the acceleration sensor arrangement may be used to trigger events such as a software interrupt, or a software routine or activation of the activation element itself as well as opening and/or closing of a transistor switch. For example, the event signal may be provided to the main processor 210 (as shown in dotted lines in FIG. 2) to trigger an event such as a software interrupt or may be used in the crash detection routine run in the main processor 210 which determines whether the squib 201 should be deployed or not. In the latter example (e.g. for a side airbag arrangement), the main processor 210 can therefore use inputs from acceleration sensors such as the one 211 shown in FIG. 2 and the event signal (which depends on the output from the acceleration detector 206) in order to determine whether the squib 201 should be deployed. Using additional inputs from redundant arrangements such as the acceleration sensor arrangement 202 improves the reliable operation of the system and reduces inadvertent activation.

In summary, the acceleration sensor arrangement in accordance with the present invention comprises an acceleration threshold detector which provides an output signal having one of two values depending on whether the acceleration has reached a predetermined threshold. Since the threshold detector does not provide a linear output, it is simple to implement and can be integrated on the same integrated circuit as a processor circuit required to process the output signal from the acceleration threshold detector. This provides significant cost savings due to requiring less board space and less components to implement.

By integrating the acceleration threshold detector with the processor circuit, the present invention provides a more flexible and more easily configurable solution compared to, for example, mechanical sensors, which are not re-configurable.

The invention claimed is:

1. An acceleration sensor arrangement comprising in one package:
   a logic interface of the package for receiving from external of the package a user programmable acceleration threshold and a user programmable delay;
   an acceleration threshold detector for detecting acceleration and for providing an output signal having one of a first value and a second value, the output signal having the first value when the acceleration is less than the user programmable acceleration threshold, the acceleration threshold detector being arranged to switch the output signal from the first value to the second value when the acceleration reaches the user programmable acceleration threshold, wherein the acceleration threshold detector receives the user programmable acceleration threshold from the logic interface of the package; and
   a processor circuit for receiving the output signal from the acceleration threshold detector and for generating an event signal based on the user programmable delay, the event signal to trigger an event in response to the output signal switching to the second value, wherein the processor circuit receives the user programmable delay from the logic interface of the package.

2. The acceleration sensor arrangement according to claim 1, wherein the acceleration threshold detector comprises at least one of a piezo element and a micromachined element.

3. The acceleration sensor arrangement according to claim 2, wherein the processor circuit is adapted to provide the event signal such that the event is maintained for a user programmable predetermined duration, wherein the user programmable predetermined duration is received at the processor circuit from the logic interface of the package.

4. The acceleration sensor arrangement according to claim 2, wherein the processor circuit is adapted to provide the user programmable delay between when the output signal from the acceleration threshold detector switches from the first value to the second value and a generation of the event signal.

5. A safing arrangement for an activation system comprising a safing transistor switch and the acceleration sensor arrangement as claimed in claim 2, the acceleration sensor arrangement being arranged to provide the event signal to the safing transistor switch to control the opening and closing of the safing transistor switch.

6. The acceleration sensor arrangement according to claim 1, wherein the event includes at least one of the following:
opening a transistor switch;
closing the transistor switch;
activating an activation element; and
initiating a software interrupt.

7. The acceleration sensor arrangement according to claim 1, wherein the processor circuit is adapted to provide an event signal such that the event is maintained for a user programmable predetermined duration, wherein the user programmable predetermined duration is received at the processor circuit from the logic interface of the package.

8. The acceleration sensor arrangement according to claim 6, wherein the processor circuit is adapted to provide the user programmable delay between when the output signal from the acceleration threshold detector switches from the first value to the second value and a generation of the event signal.

9. The acceleration sensor arrangement according to claim 1, wherein the processor circuit is adapted to provide the event signal such that the event is maintained for a user programmable predetermined duration, wherein the user programmable predetermined duration is received at the processor circuit from the logic interface of the package.

10. The acceleration sensor arrangement according to claim 1, wherein the processor circuit is adapted to provide the user programmable delay between when the output signal from the acceleration threshold detector switches from the first value to the second value and a generation of the event signal.

11. The acceleration sensor arrangement according to claim 1, wherein the acceleration threshold detector and the processor circuit are integrated on the same integrated circuit.

12. A safing arrangement for an activation system comprising a safing transistor switch and the acceleration sensor arrangement as claimed in claim 1, the acceleration sensor arrangement being arranged to provide the event signal to the safing transistor switch to control the opening and closing of the safing transistor switch.

13. The safing arrangement according to claim 12, wherein the safing transistor switch is integrated on the integrated circuit comprising the acceleration threshold detector and the processor circuit.

14. An activation system according to claim 1, comprising:
an activation element for activating the activation system;
a main processor circuit for providing an activation control signal to the activation element; and
the acceleration sensor arrangement for providing the event signal to the main processor circuit, the main processor circuit for providing the activation control signal to activate the activation element in dependence on the event signal.

15. The acceleration sensor arrangement according to claim 6, wherein the processor circuit is adapted to provide the event signal such that the event is maintained for a user programmable predetermined duration, wherein the user programmable predetermined duration is received at the processor circuit from the logic interface of the package.

16. The acceleration sensor arrangement according to claim 1, wherein the processor circuit is adapted to provide the user programmable delay between when the output signal from the acceleration threshold detector switches from the first value to the second value and the generation of the event signal.

17. A method comprising:
receiving, at a logic interface of an integrated circuit, first digital data for a user programmable acceleration threshold value;
providing the first digital data for the user programmable acceleration threshold value to an acceleration threshold detector of the integrated circuit, wherein the user programmable acceleration threshold value is compared with an acceleration detected in the acceleration threshold detector that when the acceleration threshold detector detects that the acceleration reaches the user programmable acceleration threshold value the acceleration threshold detector switches an output signal of from a first value to a second value;
receiving, at the logic interface, second digital data for a user programmable delay; and
providing the second digital data for the user programmable delay to a processor circuit, wherein the user programmable delay is used to set an amount of time between when the processor circuit receives the second value of the output signal from the acceleration threshold detector and when the processor circuit provides an event trigger to trigger an event.

18. The method of claim 17, further comprising:
receiving, at the logic interface, third digital data for a user programmable predetermined duration; and
providing the third digital data to the processor circuit, wherein the processor circuit is adapted to maintain the event trigger for the user programmable predetermined duration.

19. The method of claim 18, wherein the event trigger is provided to a safing transistor switch to control the opening and closing of a safing transistor switch.

20. An integrated circuit comprising:
an acceleration threshold detector to receive digital data associated with a user programmable acceleration threshold value from a logic interface of the integrated circuit, the acceleration threshold detector to detect that an acceleration value has reached the user programmable acceleration threshold value and to switch an output signal from a first value to a second value in response to the acceleration value reaching the a user programmable acceleration threshold value.

* * * * *